United States Patent

Smith et al.

[15] 3,638,207

[45] Jan. 25, 1972

[54] MAGNETIC DEVICES

[72] Inventors: David H. Smith, Lebanon Township, Hunterdon County; Le Grand G. Van Uitert, Morris Township, Morris County, both of N.J.

[73] Assignee: Bell Telephone Laboratories, Incorporated, Murray Hill, Berkeley Heights, N.J.

[22] Filed: Nov. 17, 1969

[21] Appl. No.: 877,368

[52] U.S. Cl. ................340/174 TF, 340/174 SR, 252/62.56, 252/62.57, 252/62.58, 252/62.59, 252/62.6, 252/62.61

[51] Int. Cl. ..........................................................G11b 5/62

[58] Field of Search .................................................340/174; 252/256–64

[56] References Cited

UNITED STATES PATENTS

| | | | |
|---|---|---|---|
| 2,955,085 | 10/1960 | Jonker et al. | 252/62.63 |
| 2,960,471 | 11/1960 | Gorter | 252/62.63 X |

*Primary Examiner*—James E. Poer
*Assistant Examiner*—J. Cooper
*Attorney*—R. J. Guenther and Edwin B. Cave

[57] ABSTRACT

Partial substitution of small amounts of cobalt in a class of materials, sometimes referred to as hexagonal ferrites, produces marked changes in anisotropy. This, in turn, results in an increase in domain wall mobility or in other characteristic changes of device interest. A leading class of such devices is known as "bubble" or single-wall domain devices.

4 Claims, 1 Drawing Figure

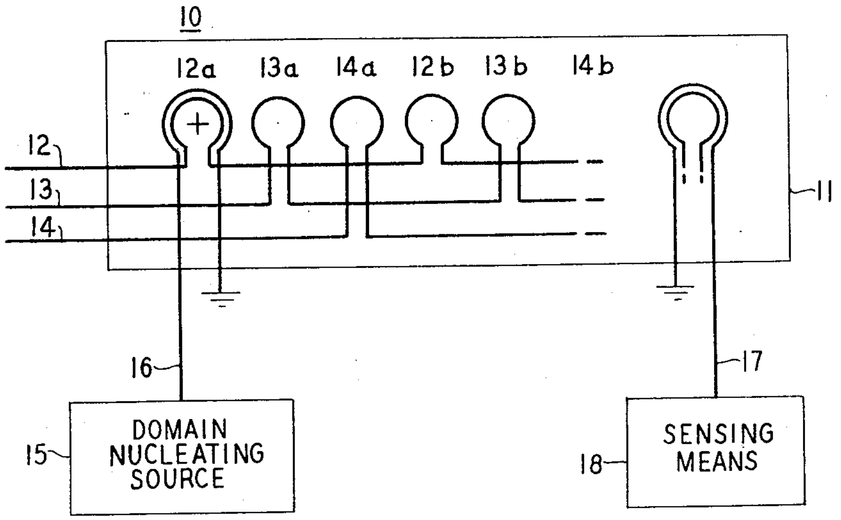
INVENTORS D. H. SMITH
L. G. VAN UITERT
BY George S. Indig
ATTORNEY

MAGNETIC DEVICES

BACKGROUND OF THE INVENTION

1. Field of the Invention

The invention is concerned with magnetic materials suitable for use in any of a class of devices variously known as "bubble" domain devices or single-wall domain devices. Devices in this class depend for their operation on the nucleation and propagation of such domains, their presence and/or position representing information "bits."

2. Description of the Prior Art

The general nature of bubble domain devices and some description of many of the forms that such devices may take is set forth in The Bell System Technical Journal, Volume XLVI, No. 8, Oct. 1967, pages 1,901–1,925. The appeal of such devices is based on a number of characteristics including ease of the write and read functions, on small power requirements and on high-bit density.

At this time, device development is at an advanced state and commercial fruition awaits a material of appropriate characteristics which may be expediently produced. Two classes of materials have been prominent in these studies. The first of these is the rare earth and related orthoferrites. Most representative materials of this class exhibit requisite uniaxial magnetization and other device properties including mobility, stability, etc., but are lacking in that they are not generally capable, in the unmodified form, of supporting sufficiently small domains to fulfill what is considered by many to be the expected high-bit density configuration.

The second class of materials may be designated hexagonal ferrites and are best represented by the magnetoplumbites. Materials of this group, too, are possessed of the appropriate anisotropy and general device properties. Again, however, hexagonal ferrites thus far tested do not at this time fulfill all of the requirements for some device designs. These materials, unlike the orthoferrites, are capable of supporting very small domains. In fact, domains so minuscule that it is necessary to dilute the atom responsible for the main magnetic contribution with nonmagnetic elements to increase domain size. The deficiency of these materials is in a different area. Characteristic examples tested have manifested insufficient domain wall mobility to satisfy many prospective device requirements.

SUMMARY OF THE INVENTION

In accordance with the invention, it has been determined that certain anisotropy changes favoring bubble domain device use may be brought about by use of small amounts of cobalt. This element, which may enter the compound in either its divalent or trivalent form, goes into an iron site.

The precise effect of the cobalt addition depends on the hexagonal ferrite type. In the instance of M or W modifications as defined below, cobalt reduces uniaxial anisotropy. The effect is to reduce domain wall energy and thereby increase wall mobility. In the instance of the S, Y, or Z modifications in which the easy direction of magnetization is the *a*-plane (rather than along the *c*-axis) the addition of cobalt, coupled with a magnetic annealing step with the field applied in a direction in the *a*-plane, produces an anisotropy in the plane and also increases bubble size. This anisotropy variation in the example of bubble device use may convert such materials for the first time to a usable form with easy direction now along an *a*-axis (so that the crystal sheet or layer required for a bubble device is oriented normal to the *a*-plane and is perpendicular to the induced easy axis). In another species of the invention, magnetic annealing (at or below the Curie temperature with a magnetic field applied across the sample in a direction encompassed by the *a*-plane) applied to an M or W modification, produces an anisotropy in the *a*-plane and may result in a further contribution being made to mobility increase. This increase is due to a minimization of spin presession in the *a*-plane.

BRIEF DESCRIPTION OF THE DRAWING

The FIGURE is a schematic representation of a device depending for its operation upon the nucleation and propagation of single-wall domains in a material of the invention.

DETAILED DESCRIPTION

1. Composition

Relevant materials are first described in terms of their unmodified form. All such materials may be generally classified as hexagonal ferrites, as above indicated. Known modifications have historically been designated as the M, W, X, Y, and Z modifications of hexagonal ferrites as defined by P. B. Braun: Philips Res. Rpts 12 (1957) 491. Mixtures of these modifications may be made and are also suitable for the practice of the invention. As indicated, the first two manifest a desirable uniaxial *c*-direction anisotropy, while the other three have an easy plane of magnetization in the hexagonal *a*-plane.

Included class of components may be generalized in accordance with the formula:

$xAO \cdot yEO \cdot zG_2O_3$ where:

- A = Ba, Sr, Ca, Cd, Pb and the 4*f* rare earth ions and/or combinations of ions, the first monovalent and the second trivalent, included in pairs for charge compensation. Such pairs include any of the monovalent ions Li, Na and K with any of the trivalent ions La, Y, Sc, and Bi.
- E = the divalent ions of Fe, Ni, Zn, Cu, Mg, and/or Mn.

and

- G = the trivalent ions of Fe, Al, Ga, Cr, In, and V as well as any of the enumerated B ions paired with the compensating tetravalent ions Ti, Si, or Ge.

The following is a tabulation of exemplary hexagonal ferrites all including barium and iron, one each for the various concerned modifications.

TABLE I

| Symbol | Formula | Oxygen Ba block | Layers per spinel block | Space group | C Axis in A |
|---|---|---|---|---|---|
| M | $BaFe_{12}^{III}O_{19}$ | 1 | 4 | $P6_3/mmc$ | 23.2 |
| W | $BaFe_2^{II}Fe_{16}^{III}O_{27}$ | 1 | 6 | $P6_3/mmc$ | 32.8 |
| X | $Ba_2Fe_2^{II}Fe_{28}^{III}O_{46}$ | 2 | 4–6 | $R\bar{3}m$ | 84.1 |
| Y | $Ba_2Zn_2^{II}Fe_{12}O_{22}$ | 2 | 4 | $R\bar{3}m$ | 43.6 |
| Z | $Ba_3Co_2^{II}Fe_{24}^{III}O_{41}$ | 1–2 | 4 | $P6_3/mmc$ | 52.3 |

NOTE.—a-axis is 5.9 A. in each case.

In table I, the first column sets forth the modifications, the second sets forth the exemplary formula, the fifth is the crystallographic space group and the sixth is the length of the *c*-axis per unit cell in Angstrom units. Columns 3 and 4 indicate the structural relationship of the modifications. The hexagonal orthoferrites are all layered structures and the relationship of the modifications may be considered in these terms. Looking down the *c*-axis, there is either a single or double layer of oxygen ions containing large A ions alternating with spinellike blocks of four or six oxygen layers containing E ions.

It should be understood that table I is merely exemplary, with the entire set of modifications utilizing the A ion, barium. The entire family of components has been set forth in terms of the formula. In the general formula, *x* is 1, 2 or 3, *y* is 0, 1 or 2 and *z* is 6, 8, 12 or 14. However more complex structures are possible.

The general requirement of all of the compositions herein is the inclusion of cobalt. It has been experimentally observed that as little as 1 ion percent base on total E and G ion content can produce a significant improvement either in mobility (in the instance of the M or W modifications) or in anisotropy (in the instance of the X, Y, or Z modifications). The maximum cobalt content may be as high as 20 ion percent on the same basis, it being observed that appreciably greater amounts, produce little further improvement in either property. A preferred range is from 2 ion percent to 15 ion percent and a still further preferred range is from 3 ion percent to 10 ion percent (all based on total E and G ion content).

2. Relevant Mechanisms

The species of greatest interest at this time, at least for use in bubble devices, utilizes either an M or W modification or a mixture thereof. It has been indicated that the inclusion of cobalt in any such component decreases the anisotropy thereby decreasing domain wall energy and increasing mobility. Mobility, $\mu$, varies in accordance with the relationship:

$$\mu \sim (A/K_u)^{1/2}$$

where A is the exchange energy (this parameter is proportionate to the Curie temperature, $T_c$, and does not vary appreciably from compound to compound within the M and W modifications. $K_u$ is the uniaxial magnetic anisotropy, e.g., the anisotropy as between the *c*-axis or easy direction and the *a*-plane.

Table II sets forth a number of representative modifications together with certain relevant parameters.

TABLE II

| Compound | Symbol | 4πM, gauss | Tc, ° K | [K + 2K₂] (−) $K_u$ (+) or in $10^6$ erg./cc. |
|---|---|---|---|---|
| $BaFe_{12}O_{19}$ | M | 4,900 | 723 | +3.3 |
| $BaTi_{.78}Co_{.78}Fe_{10.41}O_{19}$ | M | 4,250 | 614 | +1.1 |
| $BaFe_{18}O_{27}$ | $Fe_2$-W | 4,000 | 730 | +3.0 |
| $BaMnZnFe_{17}O_{27}$ | FeZn-W | 4,700 | 700 | +2.4 |
| $BaMnZnFe_{16}O_{27}$ | ZnMn-W | 4,700 | ------------ | +1.9 |
| $BaNi_2Fe_{16}O_{27}$ | $Ni_2$-W | 4,150 | ------------ | +2.1 |
| $BaCo_{.75}Zn_{.75}Fe_{16.5}O_{27}$ | $Fe_{.5}Zn_{.75}Co_{.75}$-W | 4,500 | ------------ | −0.4 |
| $Ba_2Mg_2Fe_{12}O_{22}$ | $Mg_2$-Y | 1,500 | 450 | −0.6 |
| $Ba_2Ni_2Fe_{12}O_{22}$ | $Ni_2$-Y | 1,600 | 660 | −0.9 |
| $Ba_2Zn_2Fe_{12}O_{22}$ | $Zn_2$-Y | 2,850 | 400 | −1.0 |
| $Ba_2Co_2Fe_{12}O_{22}$ | $Co_2$-Y | 2,320 | 610 | −2.6 |
| $Ba_3Co_2Fe_{24}O_{41}$ | $Co_2$-Z | 3,350 | 680 | −1.8 |

In table II, column 1 is a listing of the conventional chemical formula for the concerned material. Column 2 sets forth the shorthand symbol so that FeZnW indicates that the concerned hexagonal ferrite is of the W modification and includes the B cations Fe and Zn. The third and fourth columns are merely the values of 4πM in Gauss and Curie temperature in degrees Kelvin. The fifth column is the appropriate anisotropy term. For the M or W modifications, except for the high Co content W material, it is simply $K_u$ which is positive; while for a modification with an easy magnetization plane, it is a two-term negative value. It has been indicated that the modifications other than M and W and their mixtures do not have the requisite uniaxial anisotropy, and in these instances this condition is introduced by strain (which may result from simple vapor disposition on an appropriate substrate). Where cobalt is included it may be induced by magnetic annealing with the field applied in a direction in the *a*-plane.

The information in table II is consistent with the earlier statement made that anisotropy is reduced by cobalt inclusion in a compound of the M or W modification. The general effect in other modifications is to increase anisotropy. This increase in anisotropy, however, is not useful alone as there is no easy direction until the material is subjected to magnetic annealing. Field annealing has been practiced in the past using cubic spinels where it simply entailed exposure to a magnetic field at a temperature below the Curie temperature. The effect is enhanced for increasing temperature (limited, of course, by the Curie temperature) and for increasing applied field (limited by the saturation field in the applied direction).

It is characteristic of the materials of concern in this invention that their magnetic moments are too large to permit sufficiently large bubble domains. It is known that this moment may be reduced by partial substitution of iron usually by a nonmagnetic substituent although sometimes by magnetic substitutions of lesser moment. Appropriate substitutions are set forth in the general formula. Probably the most common is aluminum. In a characteristic compound, substitution of this element in an amount of about 30 cation percent based on the total B-ion content is sufficient to reduce the moment to 300 gauss so as to result in a stable bubble domain diameter of the order of a sizeable fraction of a mil.

In certain instances, moment may be reduced by partial substitution of ions which also have a desirable effect in reducing anisotropy. Examples are the divalent ions of Co, Mn, Fe, Ni and Cu.

It is an unfortunate aspect of the invention that reduction in anisotropy while increasing mobility also results in a concomitant decrease in bubble domain diameter (this parameter varying as $K^{1/2}$). Fortunately, bubble diameter is dependent to a greater extent on moment (with diameter varying as $M^2$). The required additional amount of known magnetic diluent or other substituent included to reduce moment is therefore relatively small.

The data given in table III illustrates the effect of divalent cobalt inclusion on the relevant K value in low-magnetic moment materials (in which moment has been lowered by inclusion of aluminum). It may be noted that the cobalt has been valence-compensated by titanium inclusion. Other experimental work has, however, produced equivalent results without inclusion of a compensating ion. This observation casts some doubt on the statement that cobalt is necessarily divalent in the compound, and experimental information has established the suitability of trivalent cobalt for the same purposes.

TABLE III

| Composition | 4πM in gauss | Tc, ° K | K erg. cc. | Cm.μ/ sec./ oe. |
|---|---|---|---|---|
| $PbAl_3Fe_9O_{19}$ | 1,200 | 560 | $2.1\times10^6$ | 0.4 |
| $PbAl_{2.75}Ti_{1.5}Co_{1.5}Fe_{6.25}O_{19}$ | 1,200 | 410 | $1.2\times10^5$ | 1.5 |
| $PbAl_{4.4}Fe_{7.6}O_{19}$ | 600 | 410 | $1.5\times10^6$ | 0.6 |

The first three columns of table III are self-explanatory. The fourth and fifth are the anisotropy in units of ergs/c.c. and mobility in centimeters/second/oersted, respectively.

The three compositions included in table III were deliberately chosen for comparison. The anisotropy value in the second listed sample was decreased by a factor of 17 as compared to the first sample. It is evident that a part of the effect is attributable to a lowering of the value of Tc (the dependence of K on this parameter via the energy exchange value, A, has been indicated above). In the third sample the composition was deliberately modified by increasing the aluminum content to produce the same Curie temperature as that of the second sample. It is clear that this effect results in some increase in mobility (from 0.4 to 0.6). However, it is equally clear that the major part of the mobility increase is to be attributed to cobalt inclusion. In practice for particular device design, it will be necessary to balance inclusion of the two additives, i.e., the one for increasing mobility and the other for decreasing moment and thereby increasing bubble domain diameter.

3. Material Preparation

Since the prototype materials of the invention are known, and since various preparatory methods have been reported, it is unnecessary to discuss this matter in detail. Substitution of cobalt, whether in the divalent or trivalent form, has the desired effect provided it is included in the requisite amounts. Preparatory modifications are primarily occasioned by magnetic annealing, where used. This step is required in an X, Y, or Z modification and may further enhance mobility in an M or W modification.

Flux growth commonly used by workers in this art merely entails forming a solution of appropriate starting materials such as BaO and $Fe_2O_3$ (in the instance of $BaFe_{12}O_{19}$) in an appropriate flux material such as $PbO{\cdot}PbF_2{\cdot}B_2O_3$. Typical concentrations of crystal components may be in the order of 10–30 weight percent of the total melt. Crystallization may be brought about by dropping temperature or any procedure which results in a concentrating of the crystal components. Vapor deposition by transfer, by evaporation or by sputtering is useful, and it is expected that this approach will be of extreme importance. Bit densities of the order of magnitude discussed requiring bubbles of less than a mil in diameter generally require also a layer thickness of a mil or less. Expedient procedures for the preparation of self-supporting layers of this dimension are not presently available.

4. Contemplated Device Uses

It is considered beyond the necessary scope of this disclosure to describe bubble devices in their many forms in detail. Such descriptions are available in the literature. See, for example, *The Bell System Technical Journal*, Volume XLVI, 1967, at pages 1,901–1,925. The device of the figure is merely illustrative and depicts a fairly simple configuration which may be considered as a portion of a larger assembly. In the figure, a register 10 comprises a sheet 11 of samarium orthoferrite in accordance with the invention. The sheet is so oriented that at the operating temperature the preferred magnetization direction (easy direction) is normal to the plane of the sheet. Flux directed out of the paper as viewed is represented by a plus sign. Flux directed into the paper is represented by a minus sign. Conductors 12, 13, and 14, which may be deposited on the surface of sheet 11, form triplets of loops 12*a*, 13*a*, 14*a*; 12*b*, 13*b*, 14*b*, et cetera. Loop size is somewhat smaller than the size of a corresponding stable single-wall domain so that in operation any magnetized domain is partly within an adjoining loop. Such domains, once nucleated, for example, by means of a domain-nucleating source 15 and loop 16, are stepped from loop position 12*a* to 13*a* to 14*a* to 12*b* and so forth by successive energization of conductors 12, 13, and 14 in that order by means not shown. Readout is accomplished by means of loop 17 and sensing means 18.

Other device uses include switches, other types of memory elements, logic elements, et cetera. Some such devices may operate at constant temperature. Others may depend on a temperature variation sometimes local to reverse the magnetization and so provide a means for easily nucleating a domain.

The device description has been rudimentary. Devices of the type depicted in the figure have been developed to a far more advanced state. Some no longer utilize looped conductor configurations but depend upon the flux concentration which results from printed circuitry such as etched permalloy figures to control bubble position. More generally, while present interest largely centers on the use of the materials of this invention in single-wall domain elements, other devices may depend upon more conventional properties such, for example, as overall changes in magnetization, in changes in transmission properties of electromagnetic energy under the influence of an applied field, or with temperature change, et cetera.

We claim:

1. Device consisting essentially of a region of magnetic material of uniaxial magnetic anisotropy, said region having one dimension which is small relative to the two other dimensions together with first means for producing a magnetic field across at least a portion of the said region so as to effect a local reversal in magnetic polarization thereby resulting in a single-wall domain evidencing a magnetic polarization opposite to that of adjoining portions of the said region together with second means for propagating said domain through at least a part of the said region, the said material consisting essentially of a hexagonal ferrite composition of the approximate stoichiometry $xAO{\cdot}yEO{\cdot}zG_2O_3$ where A is at least one unit selected from the group of elements consisting of Ba, Sr, Ca, Cd, Pb and the pairs of elements, the first member of which is at least one element selected from the group consisting of Li, Na and K and the second member of which is at least one element selected from the group consisting of La, Y, Sc, Bi and the 4*f* rare earths, E is at least one element selected from the group consisting of Fe, Ni, Zn, Cu, Mg and Mn, and G is at least one unit selected from the group of elements consisting of Fe, Al, Ga, Cr, In and V and pairs of elements, the first member of which is at least one E element as defined above, and the second member of which is at least one element selected from the group consisting of Ti, Si, and Ge, $x$ is numerically from 1 to 3, $y$ is numerically from 0 to 2, and $z$ is numerically from 6 to 14, characterized in that said material additionally contains from one ion percent to 20 ion percent of cobalt based on the total number of E and G ions in the said stoichiometry.

2. Device of claim 1 in which the cobalt content is from 2 ion percent to 15 ion percent.

3. A device of claim 1 where the cobalt content is from 3 ion percent to 10 ion percent.

4. Device of claim 1 in which the said composition is normally possessed of uniaxial magnetic anisotropy.

* * * * *